INVENTORS
R. E. CORNWELL
PAUL L. SMITH
BY THURSTON W. HARWELL

ATTORNEY

United States Patent Office 3,113,876
Patented Dec. 10, 1963

3,113,876
PROCESS FOR PREPARING CONCENTRATED SOLUTIONS OF HEAT-SENSITIVE MATERIAL
Paul L. Smith, Orlando, Ross E. Cornwell, Jacksonville, and Thurston W. Harwell, Maitland, Fla., assignors to Union Carbide Corporation, a corporation of New York
Filed Jan. 19, 1961, Ser. No. 83,820
6 Claims. (Cl. 99—205)

The present invention relates to a process for the preparation of a concentrated solution of heat-sensitive material and, more particularly, to a process for recovering and preserving the essence of a solution of heat-sensitive material.

Heretofore, solutions of heat-sensitive material such as fruit juices have been concentrated by removing water from the solutions by evaporation. However, in addition to removing water from the solution, evaporation removes non-condensable gases and volatile flavoring constituents. While the bulk of the valuable food content of the solution is usually retained in the concentrated product, the attendant loss of volatile flavoring constituents often renders the concentrate unpalatable or deteriorates other desirable qualities of the original solution.

In the past, several processes have been proposed to recover the volatile flavoring constituents lost by evaporation, but the recovered constituents have always been allowed to deteriorate by oxidation. Although natural flavors usually cannot be improved, the process of preparation should be such that the original flavor and aroma are altered as little as possible.

It is, therefore, the main object of the present invention to recover and preserve the volatile flavoring constituents of a solution of heat-sensitive material which is to be concentrated by evaporation.

It is another object of the invention to prevent oxidation of volatile constituents recovered from a solution of heat-sensitive material.

Other aims and advantages of the invention will be apparent from the following description and appended claims.

As employed herein the following terms have the following meanings:

"Heat-sensitive material" is any material susceptible to an adverse change in its properties or composition brought about by the pure effect of heat, the degree of change varying with both time and temperature. Some examples of solutions of heat-sensitive material are fruit juices, beer, wines, coffee, and vegetable juices.

The "essence" of a solution of heat-sensitive material refers to the organic flavoring constituents of the solution which are present in various combinations to produce a recognizable and characteristic odor and flavor. These constituents usually are present in low concentrations, exert appreciable vapor pressures that are often equal to or higher than that of water, and are commonly subject to oxidation. The essences from fruit juices are shown in the following table.

COMPOSITIONS OF ESSENCES OF FRUIT JUICES

*Apple Juice*

Alcohols (92%):
   Methanol
   Ethyl Alcohol
   n-Propyl alcohol
   2-propanol
   n-Butyl alcohol
   Isobutyl alcohol
   d-2-methyl-1-butanol
   n-hexyl alcohol Carbonyl compounds (6%):
   Acetaldehyde
   Acetone
   Caproaldehyde
   2-hexanol
Esters (2%):
   Ethyl butyrate
   Ethyl caproate

*Orange Juice*

Ethyl alcohol
Acetone
Acetaldehyde
Formic acid
Amyl alcohol
Isoamyl alcohol
Phenylethyl alcohol
Typical methyl and ethyl esters of formic, acetic and caproic acids, such as:
   Methyl formate
   Ethyl formate
   Methyl acetate
   Ethyl acetate
   Methyl caproate
   Ethyl caproate

*Pineapple Juice*

Ethyl acetate
Ethyl alcohol
Acetaldehyde
Acetic acid
Methyl isocaproate
Methyl iso-valerate
Methyl n-valerate
Methyl caprylate
Sulfur compounds
Ethyl iso-valerate
Ethyl acrylate
Ethyl n-caproate

*Grape Juice*

Methyl anthranilate

In accordance with the present invention, there is provided in a process for the concentration of a solution of heat-sensitive material wherein the essence is removed from the solution, the solution from which the essence has been removed is concentrated, and the essence and the concentrated solution are recombined, the improvement which comprises removing oxygen from the essence and the solution and maintaining the essence and solution in a nonoxidizing atmosphere subsequent to the oxygen removal step.

In order to preserve the essence removed from the solution to be concentrated, the process of the present invention removes oxygen from the essence by subjecting either the fresh single-strength solution or the removed essence to a stripping operation wherein a substantially inert gas, such as nitrogen, is passed through the essence or the solution so as to preferentially displace at least a portion of oxygen present in the essence or solution. This stripping operation removes only the oxygen from the solution, whereas the conventional vacuum deaeration process for removing oxygen from a solution by subjecting the solution to a vacuum removes a substantial portion of the essence of the solution along with the oxygen. Thus, the oxygen stripping column employed in the inventive process removes only oxygen from the solution being treated, and the essence remains in the solution. Inert gases other than nitrogen, such as argon, hydrogen, and helium, may be employed in the stripping operation, and carbon dioxide may be used in cases where a carbonated flavor is not objectionable. To provide adequate flavor protection for extended storage periods, it is preferable to reduce the oxygen content of the solution as low as possible, and a concentration below 0.4 part per million has been found to be acceptable in most solutions. After the oxygen has been removed, both the solution and the essence are continuously maintained in a non-oxidizing atmosphere so as to minimize subsequent contamination.

Figure 1:
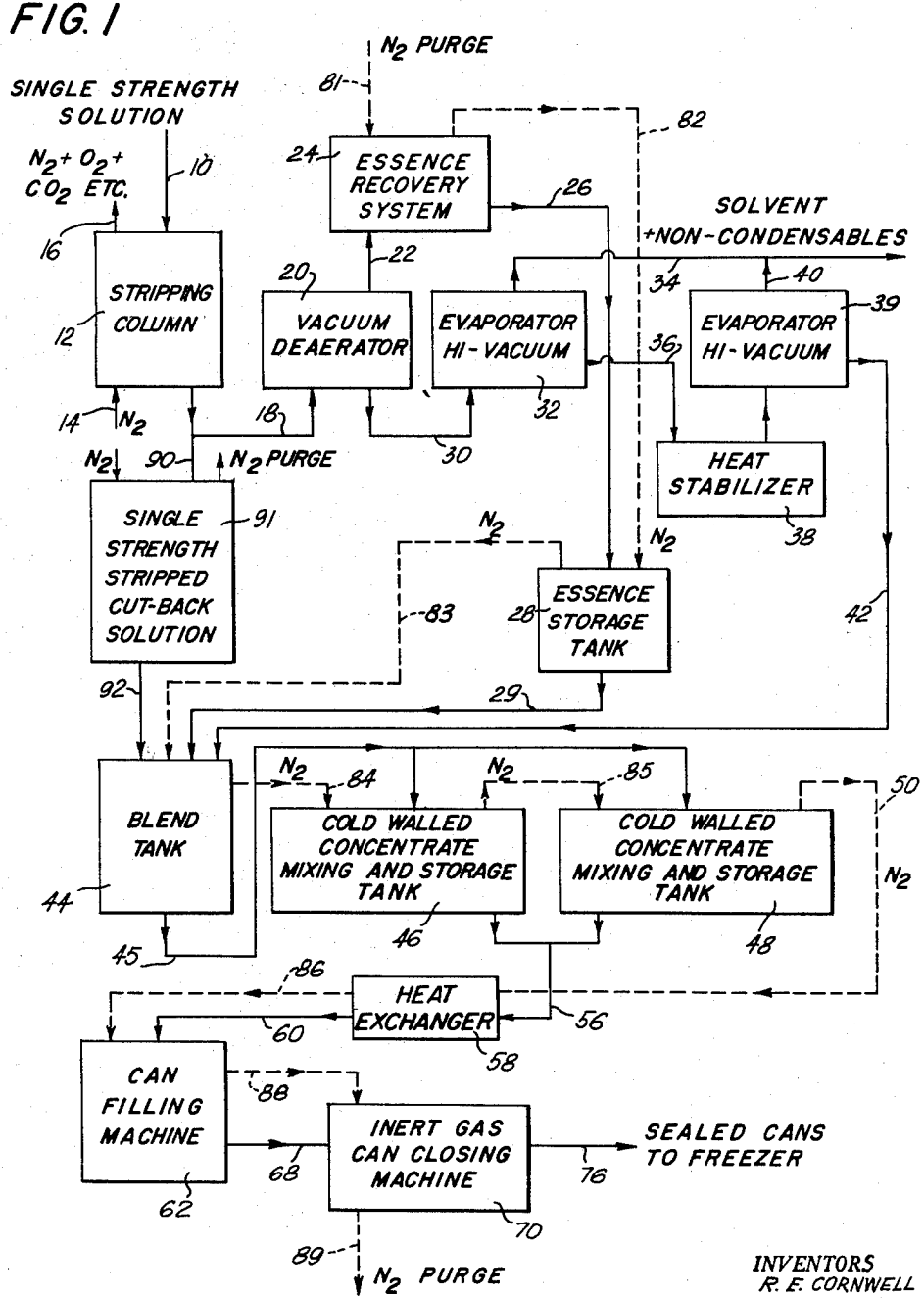
FIG. 1 is a flow sheet of a preferred continuous concentration process embodying the present invention.

Referring specifically to the preferred embodiment of FIG. 1, single-strength solution is supplied through a line 10 to a stripping column 12. An inert stripping gas, preferably nitrogen, is fed into the bottom of the stripping column 12 through a line 14 and removes oxygen and carbon dioxide from the solution. The nitrogen gas and entrained oxygen and carbon dioxide are discharged through and exhaust line 16. Since the oxygen is removed from the solution by the stripping operation rather than by a vacuum deaeration process, most of the essence remains in the solution.

From the stripping column 12, the nitrogen-stripped solution is passed through a line 18 into a vacuum deaerator 20 which preferably operates at a temperature between 50° and 55° F. The vacuum deaerator 20 removes the essence from the solution along with about 1 to 5% of the solvent. This essence is discharged from the deaerator 20 through line 22 into an essence recovery system 24 which recovers the vaporized essence. Any convenient heat exchanger may be used in the essence recovery system 24, but the recovery is preferably achieved by passing the essence into a body of the solution being treated, either single strength or concentrated, at a temperature sufficiently low to condense, absorb, and/or dissolve substantially all of said essence. From the essence recovery system 24, the recovered essence passes through line 26 into an essence storage tank 28, and then on through line 29 into the blend tank 44.

The solution remaining in the deaerator 20 is discharged through line 30 into a high vacuum evaporator 32 wherein it is concentrated. Solvent, noncondensable gases, and some of the remaining essence are removed from the solution by evaporator 32 and are discharged through a line 34. The residue passes through a line 36 to heat stabilizer 38 and on to a second stage high vacuum evaporator 39. An exhaust line 40 from the second evaporator 39 joins the line 34 to take off the same kind of vapors. The residue solution in evaporator 39 passes through a line 42 to a blend tank 44.

From the blend tank 44, a line 45 conducts the blended product to cold-walled concentrate mixing and storage tanks 46 and 48. The concentrate from the tanks 46 and 48 passes through a line 56 to a heat exchanger 58, wherein it is further cooled, and on through a line 60 to a can-filling machine 62. From the can-filling machine, the filled cans pass by conveyor 68 to a can-closing machine 70 and on into a freezer as at 76.

After the oxygen has been removed from the feed solution in stripping column 12, both the essence and the solution must be continuously maintained in a nonoxidizing atmosphere in order to minimize subsequent contamination. Thus, a nonoxidizing purge gas, preferably nitrogen, is supplied to the essence recovery system 24 through a line 81; then on through line 82 into the essence storage tank 28; then through line 83 into the blend tank 44; through line 84 into the cold-walled mixing and storage tank 46; through line 85 into the tank 48; through line 50 into the heat exchanger 58; through line 86 into the can filling machine 62; and then through line 88 into the can closing machine 70, from which the purge gas and its entrainments are exhausted through a line 89. Although the flow rate of the purge gas in the process system varies with the size and type of equipment employed, the flow rate should always be such as to provide sufficient pressure to insure that any leakage is outward from the system.

Since some small amount of essence is removed by the high vacuum evaporators 32 and 39, the exhaust vapors in line 34 may be passed into fractionating and distillation columns to separate the essence from the solvent vapors. Similarly, the exhaust vapors in line 34 may be completely condensed so that the essence can be removed therefrom by any of the herein described essence-removal processes, i.e., by vacuum deaeration or an essence stripping operation. An alternate procedure would be to dispense with the vacuum deaerator altogether and to use the evaporators to perform the double function of concentration and essence removal. As described above, the exhaust vapors from the evaporators could then be passed into fractionating and distillation columns to separate the essence from the solvent vapors, or the exhaust vapors could be completely condensed and passed into a vacuum deaerator or an essence stripping column to remove the essence.

As indicated in FIG. 1, the single-strength, stripped, cut-back solution is taken from line 18, and passed through a line 90 into a storage tank 91, and then through line 92 into the blend tank 44. The main purpose of this cut-back solution is to control the concentration level of the solution in blend tank 44. Since essence is added separately to the blend tank through line 29, the cut-back solution is more important for controlling the concentration level of the concentrate than for adding flavor to the concentrate.

In the modified embodiments of FIGS. 2 through 6 of the drawings, elements have been assigned the same numbers as assigned equivalent elements in the preferred embodiment of FIG. 1.

Figure 2:
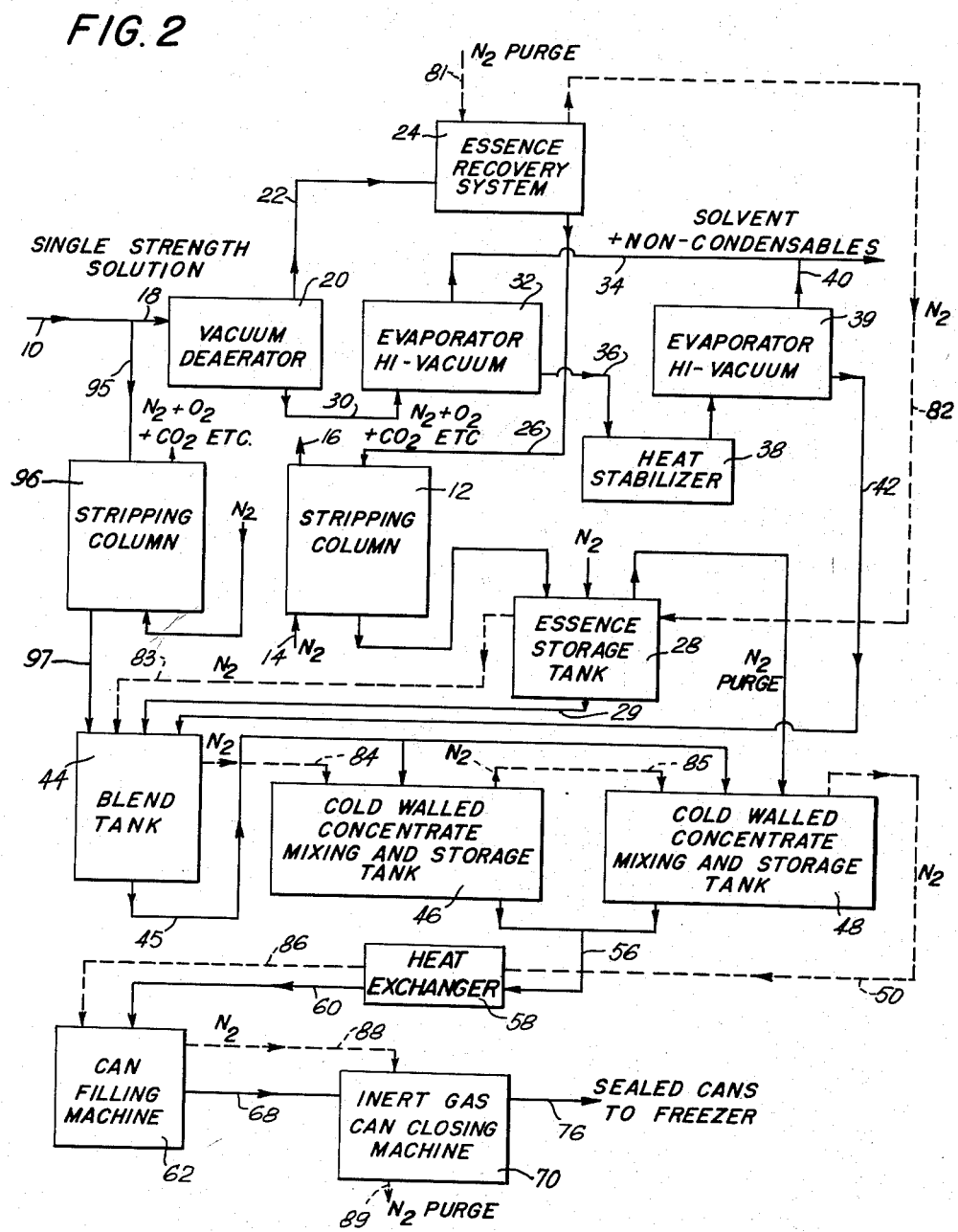
FIG. 2 is a flow sheet of a modified concentration process embodying the invention.

In the modified embodiment of FIG. 2, the stripping column 12 is placed in the line 26 between the essence recovery system 24 and the essence storage tank 28 rather than in the feed line 10. Thus, only the essence, and not the solution from which the essence has been removed, is subjected to the stripping step. However, oxygen is still removed from the concentrated solution by the high vacuum evaporators 32 and 39. Any essence contained in the exhaust vapors from the evaporators 32 and 39 may be recovered as described above for the process of FIG. 1. The purging operation is essentially the same as that explained for the embodiment of FIG. 1.

In the embodiment of FIG. 2, as in that of FIG. 1, single-strength, cut-back solution is taken from the feed line 10, and passed through a line 95 into a stripping column 96, and on through line 97 into the blend tank 44. Again, the main function of the cut-back solution is to control the concentration level of the concentrate in the blend tank.

Figure 3:
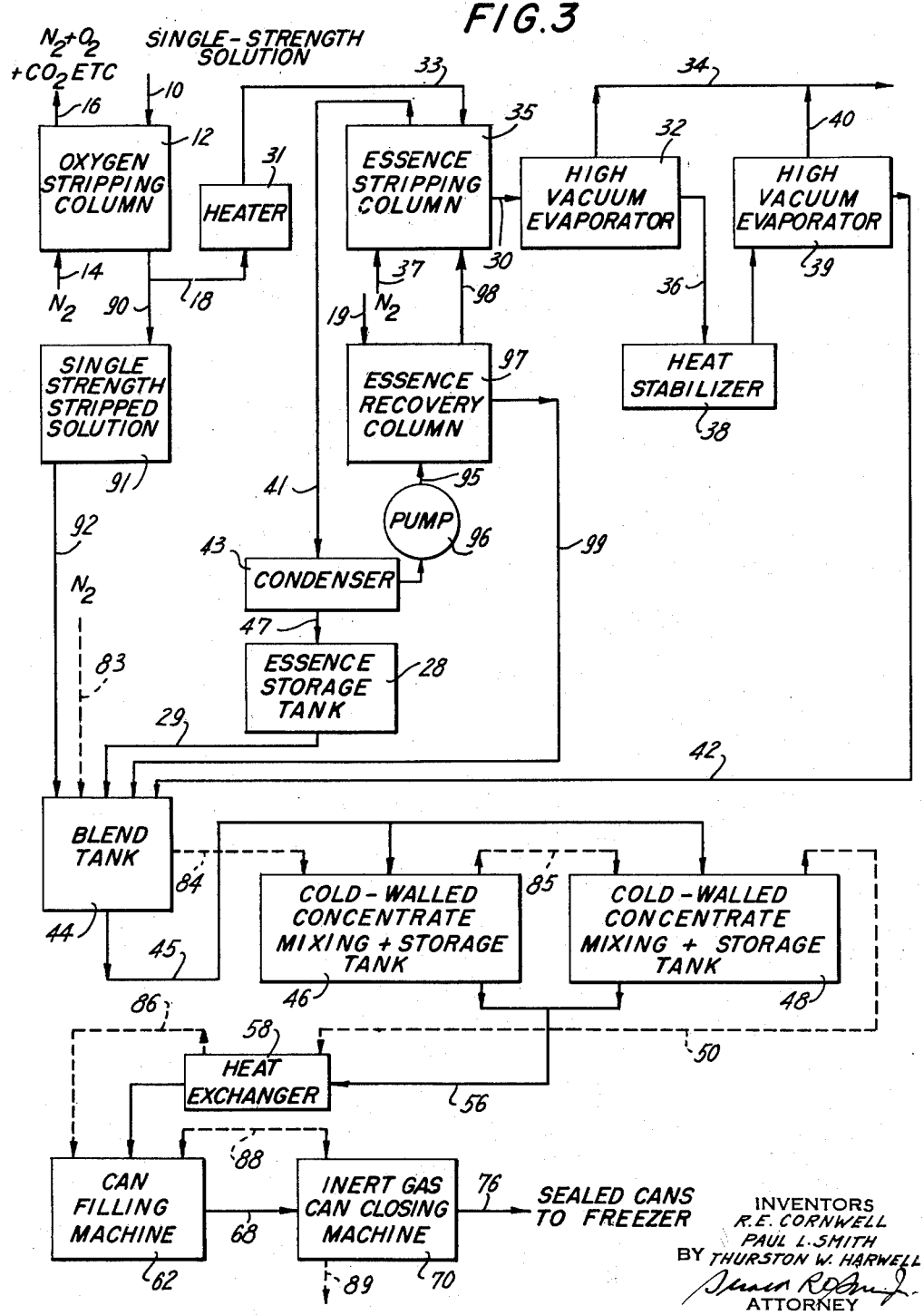
FIG. 3 is a flow sheet of another modified concentration process embodying the invention.

FIG. 3 shows a third embodiment of the present invention utilizing the hereinbefore-described stripping column and purging operations in conjunction with a different essence removal system. As in FIG. 1, single-strength solution is supplied through a line 10 to a stripping column 12 so that the essence-containing solution discharged from the column 12 through line 18 is substantially oxygen free. However, instead of removing the essence by a vacuum step, the essence in the process of FIG. 3 is removed by heating and stripping steps. Although the essence stripping column 35 is essentially the same as that previously employed to remove oxygen from the solution, the heating of the solution effected by heater 31 changes the stripping operation from one of oxygen removal to one of essence removal. Line 18 conducts the oxygen-stripped solution into heater 31 wherein the temperature of the solution is raised to an elevated temperature between 32° and 190° F. The exact temperature to which the solution is raised depends on the flow rate of the stripping gas in the essence stripping column, the vapor pressure of the essence to be removed, and the temperature at which the desirable qualities of the solution are changed. As the temperature of the solution is increased, the vapor pressure of the essence of the solution will be increased, and the flow rate of the stripping gas required to remove the essence will be decreased. In other words, the higher the vapor pressure of the essence, the lower the flow rate of stripping gas required to remove the essence. However, the temperature to which the solution can practically be raised is limited to the temperature at which the desirable qualities of the solution are changed. As a result, the temperature of the solution is usually raised to a temperature slightly below that at which the desirable qualities of the solution are changed. From heater 31, the solution passes through line 33 into the essence stripping column 35. Inert gas fed into the bottom of this stripping column 35 through line 37 removes the essence from the solution, and the stripping gas and entrained essence are discharged through line 41 into a condenser 43. The exact flow rate of the stripping gas in stripping column 35 is determined as described above.

Any convenient heat exchanger may be employed as condenser 43. The condensed essence is removed from condenser 43 and passed through line 47 into the essence storage tank 28, and therefrom through line 29 into the blend tank 44. The noncondensable stripping gas and noncondensable components of the essence which are not recovered in the condenser 43 are removed from the condenser by a pump 96 and passed through line 95 into an essence recovery column 97, which comprises a cooled body of the solution being treated at a temperature sufficiently low to absorb and/or dissolve substantially all the remaining essence. The stripping gas is withdrawn from the essence recovery column 97 through line 98 and recycled back to the essence stripping column 35. Any losses in the recycled gas due to leaks in the system and solubility of the gas in the solution being treated are made up by gas from the original stripping gas feed line 37. Since the inert stripping gas is present in the condenser 43, the essence storage tank 28, and the essence recovery column 97, the nonoxidizing purge gas is not required in these stages, and the purge gas is fed initially into the blend tank 44 through line 83.

Figure 4:
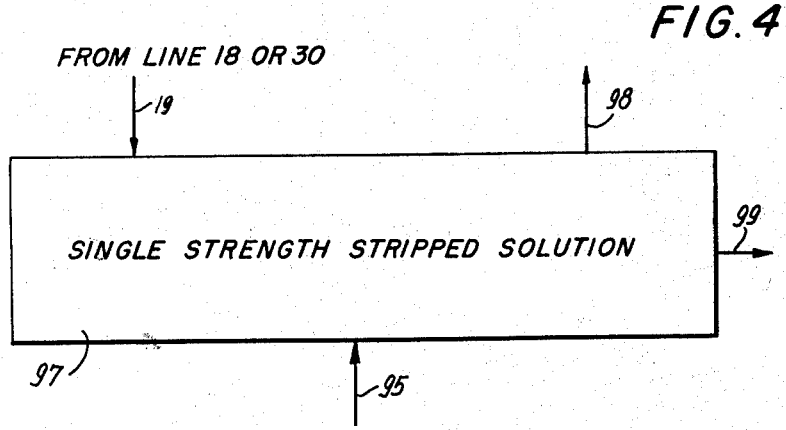
FIG. 4 is a partial flow sheet showing the use of stripped, single-strength solution in the essence recovery column of FIG. 3.

As illustrated in FIG. 4, the cooled body of solution in the essence recovery column 97 may be single-strength, stripped solution. The single-strength solution may be stripped of only oxygen such as that contained in line 18 of FIG. 3, or may be stripped of both oxygen and essence, such as that contained in line 30 of FIG. 3. The single-strength solution is supplied to the essence recovery column 97 through a line 19, the stripping gas and entrained essence enter through line 95, and the essence-containing solution is discharged into the blend tank 44 through a line 99.

Figure 5:
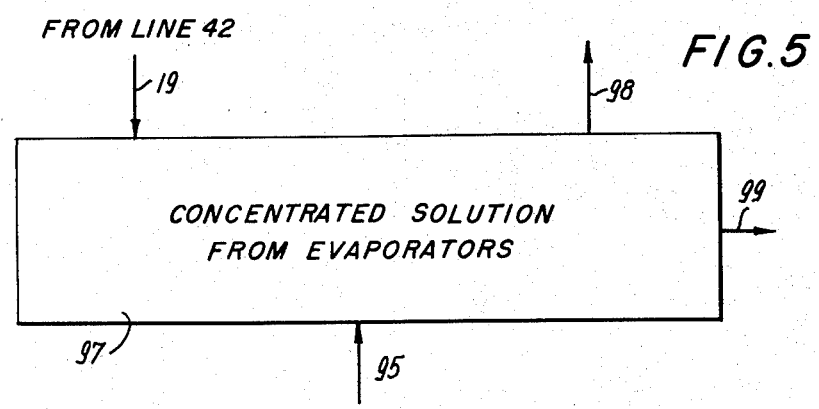
FIG. 5 is a partial flow sheet showing the use of concentrated solution in the essence recovery column of FIG. 3.

As illustrated in FIG. 5, the cooled body of solution in the essence recovery column 97 may be concentrated solution from the evaporators, such as that contained in line 42 of FIG. 3. Alternatively, the cooling concentrate may be produced by any other concentration process, such as a freeze concentration process, i.e., a process wherein a solution is concentrated by freezing the solvent and then removing the frozen solvent from the concentrated solution. In any event, however, the cooling solution should be substantially oxygen-free. The concentrated solution is supplied to the recovery column through a line 19, the stripping gas and entrained essence enter through line 95, and the essence-containing solution is discharged into the blend tank through a line 99.

Figure 6:
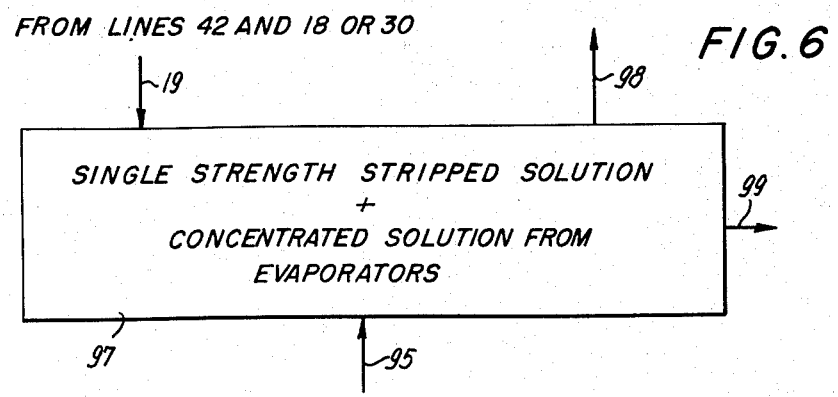
FIG. 6 is a partial flow sheet showing the use of a blend of single-strength solution and concentrated solution in the essence recovery column of FIG. 3.

In FIG. 6, the cooled body of solution is a blend of single-strength, stripped solution and concentrated solution from the evaporators. As in FIG. 4, the single-strength solution must be oxygen-free and may also be essence-free. As in FIG. 5, the concentrated solution must be oxygen-free and could be produced by any convenient concentration process. The single-strength and concentrated solutions are supplied to the essence recovery column 97 through line 19, the stripping gas and entrained essence enter through line 95, and the essence-containing solution is discharged into the blend tank through a line 99. When the blend of single-strength and concentration solutions is employed as the condensing body, the concentration of the solution in the blend tank 44 can be controlled by adjusting the concentration and flow rate of the essence-containing solution leaving the column 97 through line 99.

Of course, other modifications of the process can be devised within the scope of the invention described herein. For example, the essence may first be removed by the heating and stripping process, condensed, and then subjected to a second stripping step to remove the oxygen. In any such process, however, it is essential that oxygen be removed from the essence either before or after the removal of the essence from the solution.

What is claimed is:

1. A process for the concentration of a solution of heat-sensitive material selected from the group consisting of fruit juices, beer, wines, coffee, and vegetable juices comprising: subjecting said solution to a stripping operation wherein an inert gas is passed through said solution so as to preferentially displace substantially all the oxygen present in said solution; removing the essence from said solution which has been subjected to said stripping operation by subjecting said solution to a pressure less than atmospheric; concentrating said solution from which said essence has been removed by evaporating solvent from said solution while subjecting said solution to a pressure less than atmospheric; protecting said essence and said solution from contamination by maintaining them under non-oxidizing conditions; and recombining said essence and said concentrated solution and storing the recombined product under nonoxidizing conditions.

2. A process for the concentration of a solution of heat-sensitive material selected from the group consisting of fruit juices, beer, wines, coffee, and vegetable juices comprising: subjecting said solution to a stripping operation wherein an inert gas is passed through said solution so as to preferentially displace the oxygen present in said solution; increasing the temperature of said solution which has been subjected to said stripping operation; removing the essence from said heated solution by subjecting said solution to a stripping operation wherein an inert gas is passed through said solution so as to preferentially displace at least a portion of the essence present in said solution; condensing said removed essence by passing said essence into a body of said solution of heat-sensitive material at a temperature sufficiently low to condense substantially all of said essence; concentrating said solution from which said essence has been removed by evaporating solvent from said solution while subjecting said solution to a pressure less than atmospheric, protecting said essence and said solution from contamination by maintaining them under nonoxidizing conditions; and recombining said essence and said concentrated solution and storing the recombined product under nonoxidizing conditions.

3. A process for the concentration of a solution of heat-sensitive material selected from the group consisting of fruit juices, beer, wines, coffee, and vegetable juices comprising: subjecting said solution to a stripping operation wherein an inert gas is passed through said solution so as to preferentially displace substantially all the oxygen present in said solution; increasing the temperature of said solution which has been subjected to said stripping operation to an elevated temperature between 32° F. and 190° F.; removing the essence from said heated solution by subjecting said solution to a stripping operation wherein an inert gas is passed through said solution so as to preferentially displace substantially all the essence present in said solution; concentrating said solution from which said essence has been removed by evaporating solvent from said solution while subjecting said solution to a pressure less than atmospheric, protecting said essence and said solution from contamination by maintaining them under nonoxidizing conditions; and recombining said essence and said concentrated solution and storing the recombined product under nonoxidizing conditions.

4. A process for the concentration of a solution of heat-sensitive material selected from the group consisting of fruit juices, beer, wines, coffee, and vegetable juices comprising: removing the essence from said solution by subjecting said solution to a pressure less than atmospheric; subjecting said essence to a stripping operation wherein an inert gas is passed through said essence so as to preferentially displace substantially all the oxygen present in said essence; concentrating said solution from which said essence has been removed by evaporating solvent from said solution while subjecting said solution to a temperature less than atmospheric; protecting said essence and said solution from contamination by maintaining them under nonoxidizing conditions; and recombining said essence and said concentrated solution and storing the recombined product under nonoxidizing conditions.

5. A process for the concentration of a solution of heat-sensitive material selected from the group consisting of fruit juices, beer, wines, coffee, and vegetable juices comprising: removing the essence from a portion of said solution by subjecting said solution to a pressure less than atmospheric; subjecting said essence to a stripping operation wherein an inert gas is passed through said essence so as to preferentially displace substantially all the oxygen present in said essence; concentrating said portion of solution from which said essence has been removed by evaporating solvent from said solution while subjecting said solution to a pressure less than atmospheric; subjecting a second portion of solution to a stripping operation wherein an inert gas is passed through said solution so as to preferentially displace substantially all the oxygen present in said solution; protecting said essence, said concentrated portion of solution, and said second portion of solution from contamination by maintaining them under nonoxidizing conditions; and recombining said essence, said concentrated portion of solution, and second portion of solution and storing the recombined product under nonoxidizing conditions.

6. A process for the concentration of a solution of heat-sensitive material selected from the group consisting of fruit juices, beer, wines, coffee, and vegetable juices comprising: subjecting said solution to a stripping operation wherein an inert gas is passed through said solution so as to preferentially displace substantially all the oxygen present in said solution; removing the essence from said solution which has been subjected to said stripping operation by subjecting said solution to a pressure less than atmospheric; dissolving said removed essence by passing said essence into a body of said solution of heat-sensitive material at a temperature sufficiently low to dissolve substantially all of said essence; concentrating said solution from which said essence has been removed by evaporating solvent from said solution while subjecting said solution to a pressure less than atmospheric; protecting said essence and said solution from contamination by maintaining them under nonoxidizing conditions; and recombining said essence and said concentrated solution and storing the recombined product under nonoxidizing conditions.

References Cited in the file of this patent
UNITED STATES PATENTS

| | | |
|---|---|---|
| 2,666,707 | Bew | Jan. 19, 1954 |
| 2,911,308 | Smith | Nov. 3, 1959 |